Patented Apr. 3, 1923.

1,450,836

UNITED STATES PATENT OFFICE.

ALFRED W. BOSWORTH, OF BOSTON, MASSACHUSETTS.

POWDERED MODIFIED-MILK SUBSTITUTE.

No Drawing.  Application filed January 16, 1922.  Serial No. 529,715.

*To all whom it may concern:*

Be it known that I, ALFRED W. BOSWORTH, a citizen of the United States, residing at Boston, in the county of Suffolk and State of Massachusetts, have invented certain new and useful Improvements in Powered Modified-Milk Substitutes, of which the following is a specification.

The present invention relates to a dry material which can be used for the production of a substitute for human milk, for feeding infants.

The object of the invention is to produce a dry pulverulent or flaky or granular material which when mixed with water and agitated, will readily emulsify in the water (or "dissolve," as the term is generally used in this art,) so as to produce a relatively stable or permanent emulsion having approximately the same percentage analysis as normal human milk. In this specification, the term "oils" is used to embrace not only liquid oils, but also normally solid oils, the latter being commonly known as "fats."

I produce the product by mixing together, in proper proportions, a solid dry material which contains oils in a readily emulsifiable form, dried milk serum (also known as dried whey), a sugar and, if desired, also solubilized protein.

The first of these materials may, for example, be such a product as is described in the patent of H. V. Dunham 1,302,486, in which is disclosed a process which consists in dissolving a proteid material in a solvent (casein in a very dilute solution of an alkali being mentioned therein by way of example), and emulsifying in such liquid a suitable quantity of an oil of an edible character, after which the emulsion is homogenized and then dried at a temperature sufficiently low to prevent the insolubilization of the proteid.

In the present invention such a product forms one of the preferred constituents, although it is to be understood that I do not restrict myself to the details as given in the Dunham patent.

The dry soluble protein used may be a soluble sodium, potassium or calcium caseinate or paracaseinate. I prefer to use a soluble caseinate neutral to phenolphthalein which can be made by several processes now well known. Such a dry caseinate when prepared will contain in combination with the casein, the equivalent of 90 cc. of a normal alkali solution for every 100 grams of casein.

The sugar used may be any sugar or mixture of sugars. Such sugar may be dextrose, maltose, sucrose or lactose. In general I prefer to use lactose.

The dry whey or dry milk serum powder may be prepared by evaporation of whey or milk serum to dryness, and by preference during the process I alter the milk salts contained therein to some extent, as by removing all or a considerable portion of the calcium compounds and the phosphorus compounds, and substituting therefor approximately an equivalent amount of potassium citrate or other salt capable of enhancing the solubility of the proteid matters of the whey, especially the lactalbumin. This part of the process can be conducted in accordance with the disclosure of my prior U. S. Patent 1,246,858, dated Nov. 20, 1917, or according to the following procedure; Fat free milk, skimmed milk or separated milk is curdled by the addition of rennin and the whey thus produced is separated by filtration or centrifugalization. The whey or serum thus obtained is neutralized by the addition of lime water in order to precipitate the excess calcium and phosphoric acid present in the milk. The precipitated calcium phosphate is removed by filtration or centrifugalization and the whey or serum thus obtained is first heated to a temperature of 60° C. to destroy the rennin and then dried to a powder by any of the well known processes used for such purposes.

The dried materials (i. e. the dried whey, the dried emulsified proteid and fat material, the sugar, and also, if desired, the soluble protein) are mixed together in such proportions as to produce a product containing about 30 parts of the oil, 60 parts of the sugar (essentially or largely lactose) 15 parts of protein and 3 parts mineral salts. This corresponds to a percentage composition of approximately 27.8% oils, 55.5% milk sugar, 13.9% protein and 2.8% mineral salts as figured on a moisture-free basis.

It is to be understood that where I have referred to dry materials used herein, these materials need not be absolutely water-free, but they are essentially of a dry appearance, although they may contain more or less moisture. The term "oil" used herein, is intended to include fats and oils, both those which are solid or semi-solid at atmospheric temperatures and those which are liquid at atmospheric temperatures.

The selection of the proteid constituent of the oil-containing material above referred to, will depend largely upon the percentage of oil which is to be mixed therewith. For most purposes I find that casein is admirably suited for the purpose, although this may be, if desired, mixed with varying proportions of other proteid materials. The oil to be used may likewise be varied considerably, but for most purposes, I find that a mixture of oils and fat of about the consistency of normal fat of normal mother's milk is preferable. The proportions of the solids to be used will, of course, depend upon the percentage of oil and proteid matter in the oil-containing emulsifiable material, the percentage of sugar and of albumen in the dried whey and the particular results to be secured. In some instances it is advisable to vary the proportions of the four primary ingredients of the final product, from those above given. For example, it might be desired, in some cases, to slightly decrease the percentage of oil and to slightly increase the percentage of, or change the nature of the protein or to change the nature and amount of sugar, using partly milk sugar and partly cane sugar, for example.

Without restricting myself to details the following examples are given for the purpose of more completely explaining the invention.

The following materials are preferably used in producing the final product:

Dry powdered material containing oil and protein (prepared in accordance with the Dunham patent, with (for example) the following composition:)

| | |
|---|---|
| Fat | 62.0% |
| Casein | 31.0% |
| Ash | 2.0% |
| Moisture, etc | 5.0% |
| Total | 100.0% |

The fat in the above mixture may have the following composition:

| | |
|---|---|
| Butter fat | 25.0% |
| Olive oil | 73.0% |
| Cod liver oil | 2.0% |
| Total | 100.0% |

Milk sugar.

Any standard high grade milk sugar or lactose may be used, which is approximately 100% pure.

Milk serum powder.

Prepared preferably according to the directions already given, this will have, for example, the following composition:

| | |
|---|---|
| Moisture | 1.5% |
| Protein (whey proteids) | 9.3% |
| Lactose | 79.0% |
| Citric acid | 5.2% |
| Ash | 6.1% |
| | 101.1% |
| Oxygen equivalent to citric acid | 1.1% |
| Total | 100.0% |

The mineral elements present in the milk serum powder are as follows:

| | |
|---|---|
| Phosphorus pentoxide ($P_2O_5$) | 0.09 % |
| Chlorine | 1.53 % |
| Calcium oxide (CaO) | 0.34 % |
| Magnesium oxide (MgO) | 0.41 % |
| Potassium oxide ($K_2O$) | 2.80 % |
| Sodium oxide ($Na_2O$) | 1.34 % |
| Iron oxide ($Fe_2O_3$) | 0.028% |
| | 6.538% |
| Oxygen equivalent to chlorin | 0.345% |
| Total ash | 6.193% |

Soluble casein.

This is a dry soluble casein of the following composition:

| | |
|---|---|
| Casein | 86.00% |
| Potassium (in combination with the casein) | 3.02% |
| Moisture | 10.98% |
| | 100.00% |

These four substances above referred to may be mixed in any desired proportions capable of producing a dry material having approximately the same percentage composition as the solids of normal human milk. It will be understood that the soluble casein may sometimes be omitted.

Example 1. The materials mentioned are mixed in the following proportions:

| | Grams. |
|---|---|
| Whey powder | 330 |
| Lactose | 340 |
| Dunham dry fat-containing powder | 473 |
| Total | 1143 |

These ingredients are thoroughly mixed and will give a substance, which will contain:

| | Per cent. |
|---|---|
| Fat | 26.25 |
| Sugar | 52.5 |
| Protein | 15.8 |
| Ash | 2.15 |
| Moisture | 2.5 |
| Undetermined matter such as citric acid, etc | 1.18 |
| Total | 100.38 |
| Correction for oxygen equivalent | .38 |
| | 100.00 |

If 114.3 grams of the mixture, as given above, are mixed with sufficient water to give exactly 1,000 cc. of solution, or if 3.66 ounces of this mixture, as given above, are mixed with sufficient water to give exactly one quart of solution, these solutions will each contain the following percentages of food material:

| | Per cent. |
|---|---|
| Fat | 3.0 |
| Sugar | 6.0 |
| Protein | 1.8 |
| Ash | 0.25 |
| | 11.05 |

Example 2. The three materials used in Example 1, together with a small amount of the soluble casein, are mixed together in the following proportions:

| | Grams. |
|---|---|
| Dunham dry fat | 473 |
| Lactose | 340 |
| Whey powder | 330 |
| Soluble casein | 23.3 |
| Total | 1166.3 |

These ingredients are thoroughly mixed and will give a substance, which will contain:

| | Per cent. |
|---|---|
| Fat | 25.72 |
| Sugar | 51.50 |
| Protein | 17.21 |
| Ash | 2.19 |
| Moisture | 3.39 |
| Undetermined matter such as citric acid, etc. | 1.16 |
| Total | 101.17 |
| Correction for oxygen equivalent | 1.17 |
| | 100.00 |

If 116.6 grams of the mixture, as given above, are mixed with sufficient water to give exactly 1,000 cc. of solution, or if 3.73 ounces of this mixture, as given above, are mixed with sufficient water to give exactly 1 quart of solution, these solutions will each contain the following percentages of food material:

| | Per cent. |
|---|---|
| Fat | 3.0 |
| Sugar | 6.0 |
| Protein | 2.0 |
| Ash | 0.26 |

The fat or oil used in the above examples is preferably composed of butter fat, olive oil, and cod-liver oil, which may be employed in the proportions above stated. The butter fat is used for the purpose of giving the proper amount of volatile fatty acids. The cod-liver oil is used for the purpose of giving an adequate amount of fat soluble vitamin in the final product.

It is to be understood that the material produced in accordance with the Dunham patent may be considerably varied, a smaller amount of fat being employed, in which case it will not be necessary to add the soluble casein separately.

What is claimed is:

1. A product capable of use for producing a human milk substitute, which comprises a mixture consisting essentially of: (a) a substantially dry bulky pulverulent to granular to flaky material containing an edible fatty oil, which material is capable of forming a relatively stable emulsion when mixed with water; (b) substantially dry whey solids; (c) a dry powdered sugar; and (d) a dry pulverulent to flaky soluble protein, such materials being mixed in such proportions as to produce a powder having approximately the same percentage composition with respect to fats, sugar, protein and salts as the solids of human milk, and such product, on mixing with water, producing an emulsion resembling normal human milk.

2. A product capable of use for producing a human milk substitute, which comprises a mixture consisting essentially of: (a) a substantially dry bulky pulverulent to granular to flaky material containing an edible fatty oil, which material is capable of forming a relatively stable emulsion when mixed with water; (b) substantially dry whey solids in which the salts of metals present have been modified by the removal of most of the calcium and phosphorus from the original whey; (c) a dry powdered sugar; and (d) a dry pulverulent to flaky soluble protein, such materials being mixed in such proportion as to produce a powder having approximately the same percentage composition with respect to fats, sugar, protein and salts as the solids of human milk, and such product, on mixing with water, producing an emulsion resembling normal human milk.

3. A product capable of use for producing a human milk substitute, which comprises a mixture containing: (a) a substantially dry bulky pulverulent to granular to flaky material containing an edible fatty oil and a soluble proteid substance, which material is capable of forming a relatively stable emulsion when mixed with water; (b) substantially dry whey solids; (c) a dry powdered sugar, such materials being mixed in such proportions as to produce a powder having approximately the same percentage composition with respect to fats, sugar, protein and salts as the solids of human milk, and such product, on mixing with water, producing an emulsion resembling normal human milk.

4. A product capable of use for producing a human milk substitute, which comprises a mixture containing: (a) a substantially dry bulky pulverulent to granular to flaky material containing an edible fatty oil, and a soluble proteid substance, which material is capable of forming a relatively stable emulsion when mixed with water; (b) substantially dry whey solids in which the salts of metals present have been modified by the removal of most of the calcium and phosphorus from the original whey; and (c) a dry powdered sugar, such materials being mixed in such proportions as to produce a powder having approximately the same percentage composition with respect to fats, sugar, protein and salts as the solids of human milk, and such product, on mixing with water, producing an emulsion resembling normal human milk.

5. A product capable of use for producing a human milk substitute, which comprises a mixture consisting essentially of: (a) a substantially dry bulky pulverulent to granular to flaky material containing an edible fatty oil, which material is capable of forming a relatively stable emulsion when mixed with water; (b) substantially dry whey solids; and other substantially dry materials, such ingredients being mixed in such proportions as to produce a product of which the dry matter has approximately the following analysis,—27.8% oil, 55.5% milk sugar, 13.9% protein and 2.8% mineral salts, such product, on mixing with water, producing an emulsion resembling normal human milk.

6. A product capable of use for producing a human milk substitute, which comprises a mixture consisting essentially of: (a) a substantially dry bulky pulverulent to granular or flaky material containing an edible fatty oil, which material is capable of forming a relatively stable emulsion when mixed with water; (b) substantially dry whey solids; and other substantially dry materials; which are mixed in such proportions as to produce a soluble product which product, when dissolved in the proper amount of water, gives an emulsion resembling normal human milk, which emulsion has the same percentage composition with respect to fats, sugar, protein and inorganic elements as normal human milk.

In testimony whereof I have signed my name to this specification.

ALFRED W. BOSWORTH.